UNITED STATES PATENT OFFICE.

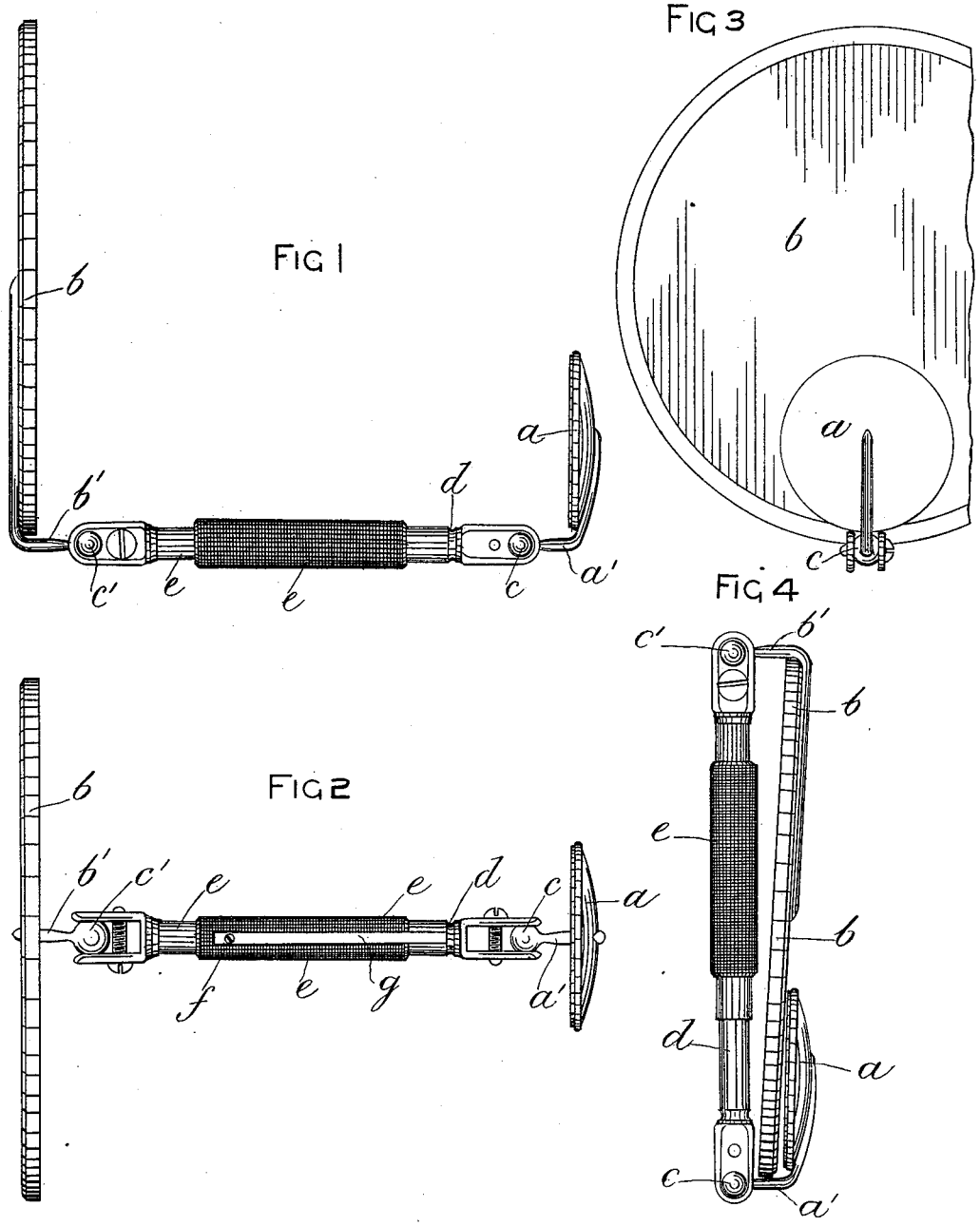

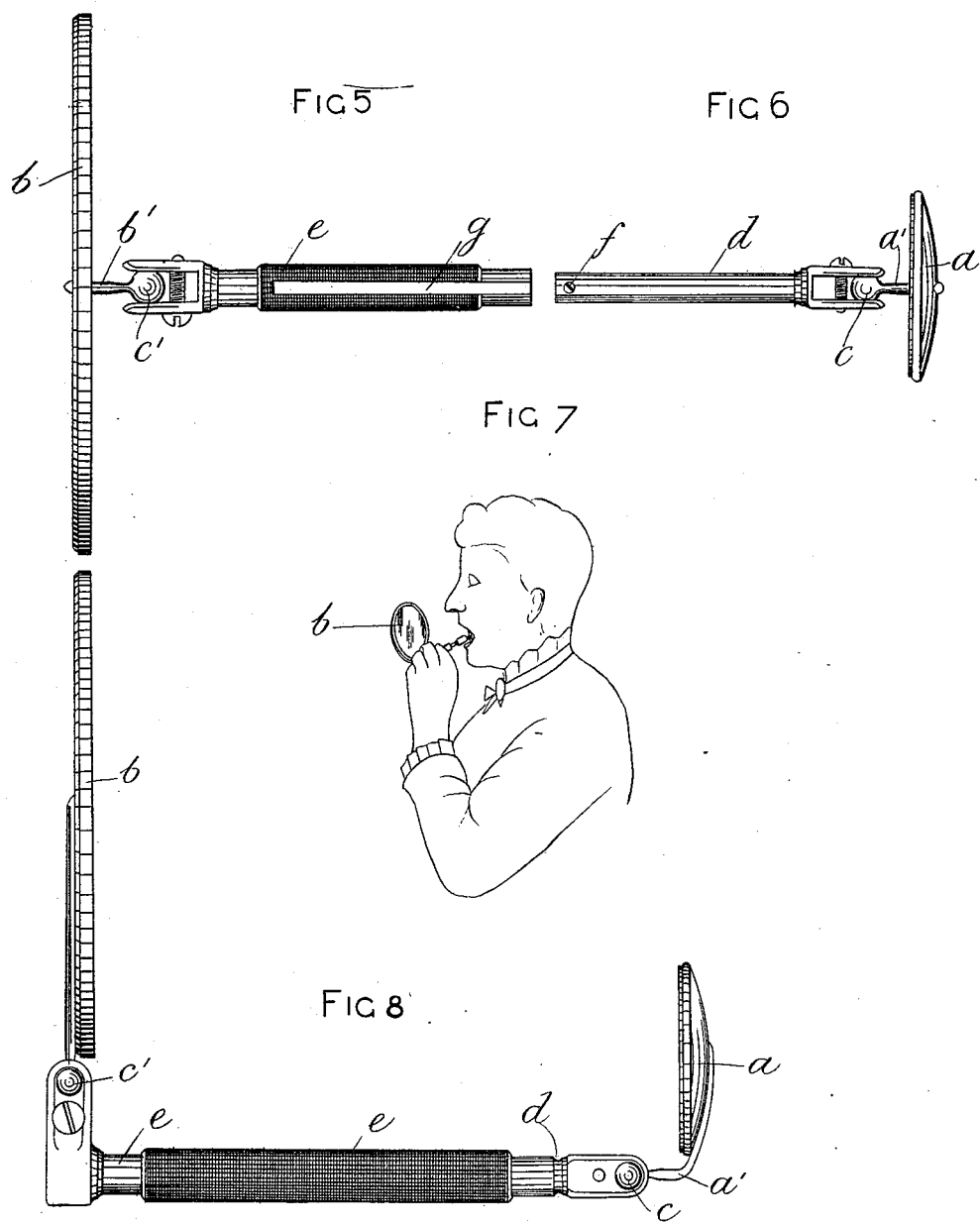

EDWIN ALBERT TICE, OF LONDON, COUNTY OF MIDDLESEX, ENGLAND.

DENTAL MIRROR.

SPECIFICATION forming part of Letters Patent No. 404,021, dated May 28, 1889.

Application filed December 1, 1888. Serial No. 292,422. (No model.)

*To all whom it may concern:*

Be it known that I, EDWIN ALBERT TICE, a subject of Her Majesty the Queen of Great Britain, residing at London, in the county of Middlesex, England, have invented certain new and useful Improvements in Dental Mirrors, of which the following is a specification.

The object of this invention is to provide a dental mirror by which any person can readily examine his or her own teeth; and the said invention consists in the combination, with a small mirror for inserting in the mouth, of a larger mirror adjustably connected to the small mirror and so arranged that by looking in the large mirror the part of the mouth reflected in the smaller mirror can be plainly seen.

The accompanying drawings show what is considered to be the best way for carrying my invention into effect; but it is to be understood that the invention is not limited to the precise details illustrated.

Figure 1 represents in side elevation, Fig. 2 in plan, and Fig. 3 in front elevation, a dental mirror constructed according to my invention. Fig. 4 shows the same mirror folded when not in use. Figs. 5 and 6 show parts of the same. Fig. 7 shows how the said dental mirror is used, and Fig. 8 illustrates a modification of my invention.

The same letters of reference indicate the same parts in all the figures.

$a$ is the small mirror for inserting into the mouth, and $b$ is the larger mirror, in which the reflection from the small mirror is seen. These mirrors are, by preference, round; but they may be oval or of any any other convenient shape. The mirror $a$ has a shank, $a'$, which is connected by a ball-and-socket joint, $c$, to a tube or rod, $d$, and the larger mirror, $b$, has a shank, $b'$, which is connected by a ball-and-socket joint, $c'$, to a tube, $e$, which latter fits outside of the tube or rod $d$, so that the tubes can slide one within the other to adjust the mirrors. The ball-and-socket joints $c$ and $c'$ may be of any usual construction—such, for instance, as that illustrated, where a ball is formed at the end of the mirror-shank, fitting in recesses between a pair of jaws, which can be tightened by a screw, as shown.

The tubes $d$ and $e$ are shown round on the drawings; but they may either be of that form or flattened, or of any other convenient shape, and when made round I prefer to provide a projecting peg, $f$, on the tube $d$, which fits into a longitudinal slot, $g$, in the tube $e$ to insure the tubes moving in a straight line. The outside of the tube $e$ may be roughened, as shown, or otherwise formed, so as to afford a firm grasp for the user's fingers. The mirror $a$ is, by preference, made slightly concave, so as to magnify and afford a better view of the teeth.

In using the dental mirror above described the small mirror is inserted by the user into his or her mouth, a little water having previously been rubbed over the small mirror to prevent tarnishing by the breath. The user's back should be turned to the light, when, by the joints and adjustable action above described, the larger mirror can be adjusted so as to show what is reflected by the smaller mirror and enable every part of the upper and lower teeth to be thoroughly examined by the person using the mirror.

When in use, the larger mirror not only enables a reflection in the smaller mirror to be seen by the user, but also serves the purposes of a reflector and throws the light into the user's mouth.

By sliding the tube or rod $d$ out of the tube $e$ the mirrors, as shown by Figs. 5 and 6, are disconnected, and the smaller mirror can be used by one person to examine the teeth of another person.

The shanks $a'$ and $b'$ of the mirrors are, by preference, cranked, as shown, so as to enable the mirrors to fold against the tube, as shown by Fig. 4, to fit into a case of about the same size as the larger mirror.

If preferred, one or more tubes may be provided between the tube or rod $d$ and the tube $e$ and arranged to slide telescopically one within the other, so as to allow of the mirrors being drawn farther apart.

In the cheaper examples of my invention the sliding adjustment of the distance between the two mirrors is dispensed with, a single bar, tube, or rod being employed, at the ends of which the mirrors are severally jointed, as above described.

In the modification illustrated by Fig. 8 the end of the tube to which the larger mirror is jointed is turned upwardly, so as to throw the larger mirror higher up and more effectually prevent the user's fingers obstructing the view.

What I claim as my invention, and desire to secure by Letters Patent, is—

In combination, the tube $e$, the tube $d$, fitted to slide within the same, the said tubes having bifurcated ends with adjusting-screws, mirrors having angular extensions $a'$ $b'$, and spherical bearings $c$ $c'$, held between the bifurcated ends of the tubes, substantially as described.

In testimony whereof I have signed in the presence of two subscribing witnesses.

EDWIN ALBERT TICE.

Witnesses:
 FRANCIS W. FRIGOUT,
 A. G. HANFORD,
  *Consulate-General, U. S. A., London.*